United States Patent Office 2,868,801
Patented Jan. 13, 1959

2,868,801

PREPARATION OF SUBSTITUTED OXAZOLIDONES

Arthur B. Steele, Ossining, N. Y., assignor to Union Carbide Corporation, a corporation of New York No Drawing. Application November 6, 1956
Serial No. 620,592

12 Claims. (Cl. 260—307)

The present invention relates to certain substituted oxazolidones and to a process for preparing them. More particularly, this invention is directed to a process for obtaining certain oxazolidones containing alkyl and hydroxyalkyl substituents obtained by the reaction of carbon dioxide and an aliphatic secondary amine corresponding to the formula:

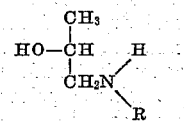

wherein R represents an alkyl or hydroxyalkyl group such as methyl, ethyl, butyl, 2-hydroxyethyl or a 2-hydroxypropyl group.

Heretofore, studies have indicated that carbon dioxide and ethanolamines in which the amine group is secondary are converted at elevated temperatures and pressures to the corresponding N,N'-disubstituted piperazines. This process of synthesis is disclosed and claimed in my copending application Serial No. 463,330, filed August 27, 1953, entitled "Process for the Production of Substituted Piperazines." It has been found that substituted piperazines are not formed upon reacting isopropanolamines containing at least one 2-hydroxypropyl group with carbon dioxides at elevated temperatures and pressures. Instead, there are formed 3-alkyl and 3-hydroxyalkyl-5-methyloxazolidones as the main, if not the sole, products.

The reaction that takes place can be illustrated by an equation as follows:

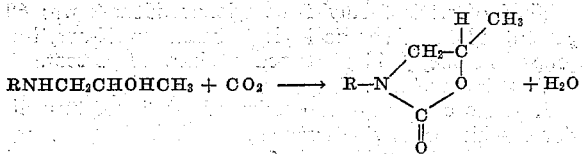

wherein R is as above defined.

The process of this invention is carried out at elevated temperatures and under superatmospheric pressures. It has been found that temperatures in the range of from 120° C. to 175° C. and superatmospheric pressures in the range of from 175 to 700 pounds per square inch absolute provide satisfactory yields of product and high efficiency. The pressure desired for the reaction may be the pressure which is derived mostly from the heating of the reactant amine carbonate salts in a closed reaction vessel or the pressure can be an externally applied pressure derived from the imposition of any other gas such as carbon dioxide or nitrogen, over the reaction medium. As a matter of practical convenience, however, it is preferred to charge an aliphatic secondary amine containing at least one 2-hydroxypropyl group to an autoclave and pressure with carbon dioxide to effect the pressure desired.

In carrying out the process of this invention, an aliphatic secondary amine containing at least one 2-hydroxypropyl group is employed either undiluted or diluted with suitable solvents such as water or diethylene glycol. Water is a preferred solvent because of its low cost, ease of removal from the reaction product, and its solvent power for both reactants and products. In the presence of water, where water is the only diluent, or water is a minor component of the total diluent, the simple carbonate salt of the substituted isopropanolamine is formed. In the absence of water, addition of carbon dioxide to the secondary amine results in the formation of the carbamic acid salt.

The ratio of carbon dioxide to amine is not a critical feature of the process. Since the formation of the oxazolidone structure requires the reaction of equimolar quantities of the substituted isopropanolamine and carbon dioxide, less than equimolar amounts of carbon dioxide in the reaction system will reduce, proportionately, the product yield.

The novel 3-hydroxyalkyl substituted 5-methyloxazolidones can be characterized by the general formula:

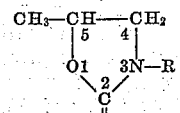

wherein R represents a lower hydroxyalkyl group such as a 2-hydroxyethyl or 2-hydroxypropyl group.

It has been discovered that 3-(hydroxyalkyl)-5-methyloxazolidones are commercially valuable as a selective solvent for the separation of aliphatic-aromatic hydrocarbon mixtures. For example, it has been found that aliphatic-aromatic hydrocarbon mixtures can be advantageously separated into fractions which differ in their degree of aromaticity, that is, into more aromatic and less aromatic fractions. The 3-(2-hydroxyalkyl)-5-methyloxazolidones can be further employed to separate hydrocarbon mixtures of the type described, into a multiplicity of fractions having different properties and, lastly, they can be employed to separate an aromatic hydrocarbon in a pure form from admixture with other hydrocarbons. The process of employing 3-(2-hydroxyalkyl)-5-methyloxazolidone-2 is described and claimed in copending application of A. B. Steele, J. B. O'Neal and J. R. Anderson, Serial No. 555,874, filed December 28, 1955, entitled "Solvent Extraction Using Substituted Oxazolidones."

The following examples will serve to illustrate the practice of the invention:

EXAMPLE I

*Preparation of 3 - (2 - hydroxypropyl)-5-methyloxazolidone-2*

A stainless steel pressure autoclave was charged with 1200 grams of an aqueous solution of diisopropanolammonium carbonate containing an equivalent of 290 grams (2.2 moles) diisopropanolamine. The autoclave was sealed and then heated at 150° C. at an initial pressure of 500 pounds per square inch (gauge) for 20 hours. The reaction mixture was removed from the autoclave; and, after distilling off the water at atmospheric pressure, the remaining material was distilled under vacuum. There were obtained 73 grams of recovered diisopropanolamine, boiling at 92–95° C. at 0.2 mm. of Hg pressure absolute and 264 grams of a colorless liquid boiling at 130–132° C. at 0.2 mm. of Hg pressure absolute, and containing a trace of diisopropanolamine as a contaminant. The amine was removed by slurrying the distillate with cation exchange resin and the product redistilled to provide material characterized as 3-(2-hydroxypropyl)-5-methyloxazolidone-2 on the basis of the following physical and chemical properties:

Boiling point, °C_____ 132–133 at 0.2 mm.
Specific gravity at 20/20° C__ 1.1398.
Refractive index, 20° C_____ 1.4690.
Molecular weight, by saponification:
　Found _____ 159.
　Calculated _____ 159.2.
Physical state, 25° C_____ Viscous, water-white liquid.
Nitrogen content, by Kjeldahl method:
　Found _____ 8.8 percent.
　Calculated _____ 8.8 percent.

A product yield of 75 percent was obtained; unreacted diisopropanolamine being recovered quantitatively.

EXAMPLE II

*Preparation of 3,5 - dimethyloxazolidone-2*

Into a stainless steel pressure autoclave were charged 292 grams (3.28 moles) of N-methylisopropanolamine as a 25 percent solution in water. The carbonate salt of the amine was formed by saturating the solution with carbon dioxide to a constant pressure of 160 pounds per square inch (gauge) and was converted to oxazolidone by heating at 160° C. and 600 pounds per square inch pressure for 24 hours. The crude make was cooled to 25° C., discharged into a laboratory still, and fractionally distilled to recover 60 grams of unconverted N-methylisopropanolamine and 240 grams of crude 3,5-dimethyloxazolidone-2 which was contaminated with approximately 3.9 percent N-methylisopropanolamine, as determined by titration with standard acid. The amine was removed by slurrying the crude product with cation exchange resin (Rohm and Haas IR-112) which had been prepared for the hydrogen cycle by treating with dilute sulfuric acid. A 3-minute contact of the resin was adequate to remove last traces of the amine. The resin was recovered by filtration and the filtrate carefully distilled to provide a pure sample of 3,5-dimethyloxazolidone-2 characterized by the following properties:

Physical state, 25° C_____ Colorless liquid.
Odor _____ Mild.
Boiling point, °C_____ 92 at 1.5 mm.
Specific gravity, 20/20° C____ 1.089.
Refractive index, ($n_d$ 21° C.)_ 1.4464.
Nitrogen content, percent by weight:
　Found _____ 12.08.
　Calculated _____ 12.15.
Yield, based on N-Methylisopropanolamine:
　Crude product_____ 63 percent.
　Refined product_____ 58 percent.

EXAMPLE III

*Preparation of 3-ethyl-5-methyloxazolidone-2*

Using the procedure outlined in Example II above, 300 grams (2.91 moles) of N-ethylisopropanolamine, as the carbonate salt, were converted to the disubstituted oxazolidone by heating for 24 hours at a temperature of 160° under a pressure of 550–600 pounds per square inch (gauge). Impure 3-ethyl-5-methyloxazolidone-2, contaminated with N-ethylisopropanolamine, was treated with cation exchange resin and redistilled to provide a product fraction, boiling 87° C. at 1 mm. of Hg pressure absolute and characterized by the following properties:

Physical state, 25° C_____ Colorless liquid.
Odor _____ Mild.
Boiling point, °C_____ 87 at 1 mm.
Specific gravity, 20/20° C____ 1.057.
Refractive index, ($n_d$ 21.2° C.) 1.4458.
Nitrogen content, percent by weight:
　Calculated _____ 10.82.
　Found _____ 10.8.

Although an accurate yield value could not be calculated due to a ruptured line which resulted in the loss of an undetermined amount of the charge to the autoclave, recovery of refined product was approximately 50 percent, based on the weight of N-ethylisopropanolamine charged to the unit.

EXAMPLE IV

*Preparation of 3-butyl-5-methyloxazolidone-2*

The carbonate salt of N-butylisopropanolamine in water solution [350 grams (2.67 moles) of N-butylisopropanolamine in 1100 grams of water] was heated in a stainless steel autoclave at 155–160° C. under pressure of 500–520 pounds per square inch (gauge) for 24 hours. Upon discharging the bomb, it was noted that the crude make had separated into two liquid phases. The oil layer was recovered and the aqueous layer extracted with benzene; the crude product fraction and the extract were combined prior to distillation. Approximately 250 grams of crude 3-butyl-5-methyloxazolidone-2-, boiling in the range of 105–108° C. at 1 mm. of Hg pressure absolute, were recovered. The product fraction was freed of a small amount of amine contaminant by treating the oxazolidone in aqueous methanol with cation exchange resin, filtered to remove the resin, and the filtrate distilled to yield 201 grams of 3-butyl-5-methyloxazolidone-2.

Physical state, 25° C_____ Colorless liquid.
Odor _____ Mild.
Boiling point, °C_____ 107 at 1 mm.
Specific gravity, 20/20° C____ 1.009.
Refractive index ($n_d$ 21.2° C.) _____ 1.4482.
Nitrogen content, percent by weight:
　Calculated _____ 8.92.
　Found _____ 8.88.

Yield of crude 3-butyl-5-methyloxazolidone-2 was 60 percent of the theoretical yield, based on N-butylisopropanolamine; yield of refined product, 48 percent.

What is claimed is:

1. A process for the production of substituted oxazolidones which comprises reacting an aliphatic secondary amine containing at least one 2-hydroxypropyl group and carbon dioxide at an elevated temperature in the range of from 120° C. to 175° C. under a superatmospheric pressure in the range of from 175 to 700 pounds per square inch absolute.

2. A process for the production of 3,5-dimethyloxazolidone-2 which comprises reacting N-methylisopropanolamine and carbon dioxide at an elevated temperature in the range of from 120° C. to 175° C. under a superatmospheric pressure in the range of from 175 to 700 pounds per square inch absolute.

3. A process for the production of 3-(2-hydroxypropyl)-5-methyloxazolidone-2 which comprises reacting diisopropanolamine and carbon dioxide at an elevated temperature in the range of from 120° C. to 175° C. under a superatmospheric pressure in the range of from 175 to 700 pounds per square inch absolute.

4. A process for the production of 3-butyl-5-methyloxazolidone-2 which comprises reacting N-butylisopropanolamine and carbon dioxide at an elevated temperature in the range of from 120° C. to 175° C. under a superatmospheric pressure in the range of from 175 to 700 pounds per square inch absolute.

5. A process for the production of a 3-alkyl-5-methyl-oxazolidone-2 which comprises reacting secondary aliphatic amine containing at least one 2-hydroxypropyl group and carbon dioxide at an elevated temperature in the range of from 120° C. to 175° C. under a superatmospheric pressure in the range of from 175 to 700 pounds per square inch absolute.

6. A process for the production of alkyl and hydroxyalkyl substituted oxazolidones which comprises reacting a secondary aliphatic amine corresponding to the formula:

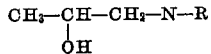

wherein R represents members selected from the group consisting of lower alkyl and lower hydroxyalkyl groups and carbon dioxide at an elevated temperature in the range of from 120° C. to 175° C. under a superatmospheric pressure in the range of from 175 to 700 pounds per square inch absolute.

7. A process for the production of alkyl and hydroxyalkyl-substituted oxazolidones which comprises heating a reaction mixture comprising carbon dioxide and a secondary aliphatic amine corresponding to the formula:

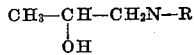

wherein R represents members selected from the group consisting of lower alkyl and lower hydroxyalkyl groups at an elevated temperature in the range of from 120° C. to 175° C. under a superatmospheric pressure in the range of from 175 to 700 pounds per square inch absolute.

8. A process for the production of alkyl and hydroxyalkyl-substituted oxazolidones which comprises heating a reaction mixture comprising carbon dioxide and an aqueous solution of a secondary aliphatic amine corresponding to the formula:

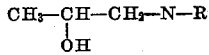

wherein R represents members selected from the group consisting of lower alkyl and lower hydroxyalkyl groups at an elevated temperature in the range of from 120° C. to 175° C. under a superatmospheric pressure in the range of from 175 to 700 pounds per square inch absolute.

9. A process for the production of alkyl and hydroxyalkyl-substituted oxazolidones which comprises heating a reaction mixture comprising carbon dioxide and a diethylene glycol solution of a secondary aliphatic amine corresponding to the formula:

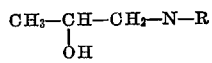

wherein R represents members selected from the group consisting of lower alkyl and lower hydroxyalkyl groups at an elevated temperature in the range of from 120° C. to 175° C. under a superatmospheric pressure in the range of from 175 to 700 pounds per square inch absolute.

10. A process for the production of alkyl and hydroxyalkyl-substituted oxazolidones which comprises heating a reaction mixture comprising carbon dioxide and a diethylene glycol-water solution of a secondary aliphatic amine corresponding to the formula:

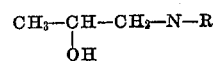

wherein R represents members selected from the group consisting of lower alkyl and lower hydroxyalkyl groups at an elevated temperature in the range of from 120° C. to 175° C. under a superatmospheric pressure in the range of from 175 to 700 pounds per square inch absolute.

11. A process for the production of alkyl and hydroxyalkyl-substituted oxazolidones which comprises reacting carbon dioxide and a secondary aliphatic amine containing at least one 2-hydroxypropyl group to form a reaction mixture containing the carbamic acid salt corresponding thereto, and heating said reaction mixture at an elevated temperature in the range of from 120° C. to 175° C. under a superatmospheric pressure in the range of from 175 to 700 pounds per square inch absolute.

12. A process for the production of alkyl and hydroxyalkyl-substituted oxazolidones which comprises reacting carbon dioxide and an aqueous solution of a secondary aliphatic amine containing at least one 2-hydroxypropyl group to form a reaction mixture containing the carbonate salt corresponding thereto, and heating said reaction mixture at an elevated temperature in the range of from 120° C. to 175° C. under a superatmospheric pressure in the range of from 175 to 700 pounds per square inch absolute.

References Cited in the file of this patent

UNITED STATES PATENTS

| | | |
|---|---|---|
| 2,399,118 | Homeyer | Apr. 23, 1946 |
| 2,755,286 | Bell et al. | July 17, 1956 |
| 2,773,067 | Viard | Dec. 4, 1956 |

FOREIGN PATENTS

| | | |
|---|---|---|
| 913,163 | France | May 20, 1946 |

UNITED STATES PATENT OFFICE
CERTIFICATE OF CORRECTION

Patent No. 2,868,801                            January 13, 1959

Arthur B. Steele

It is hereby certified that error appears in the printed specification of the above numbered patent requiring correction and that the said Letters Patent should read as corrected below.

Column 5, lines 16 to 18, claim 6, lines 29 to 31, claim 7, lines 41 to 43, claim 8, column 6, lines 3 to 5, claim 9, and lines 16 to 18, claim 10, the formula, each occurrence, should appear as shown below instead of as in the patent:

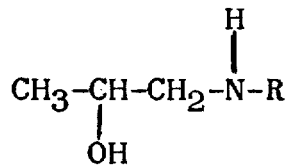

Signed and sealed this 19th day of July 1960.

(SEAL)
Attest:

KARL H. AXLINE                                          ROBERT C. WATSON
Attesting Officer                                    Commissioner of Patents